3,210,205
REFRACTORY BONDED WITH PITCH
Robert F. Shurtz, Cleveland, Ohio, assignor to Basic Incorporated, Cleveland, Ohio, a corporation of Ohio
No Drawing. Filed Mar. 16, 1961, Ser. No. 96,076
17 Claims. (Cl. 106—56)

The present invention relates to an improved refractory and, more particularly, to a basic refractory bonded during manufacture with coal tar pitch and having an improved carbon bond at elevated temperatures of use.

Refractory articles, usually in the form of brick, have wide applications in many industrial processes, notably those involving high temperatures such as in the manufacture of steel. The class of refractories known in the art as basic refractories include calcium oxide and magnesium oxide or mixtures and compounds thereof. Refractories of this class may be obtained by firing dolomite, such as is found in northern Ohio, or magnesian ores such as magnesite, at elevated temperatures. Ordinarily, the firing is complete to form a dead-burned material in which all of the mineral is converted to the oxide and caused to react with such dead-burning agents as may be present.

In order to facilitate firing and permit the use of lower temperatures, it is a common practice to add dead-burning agents, or fluxes, or to take advantage of those naturally present in the raw stone. Iron oxide is popularly used as a flux since it reacts easily with the resulting sintered calcium and magnesium oxides to form either calcium ferrite and dicalcium ferrite, in the case of the former, and solid solutions with periclase or magnesioferrite, in the case of the latter. As a result, an appreciable amount of iron forms a part of the resulting dead-burned material. Thus iron may be present in an amount up to 6 percent by weight and even higher, calculated as iron.

It has been customary in some applications to produce refractory brick or other shapes from dead-burned dolomite and/or dead-burned magnesite refractory bonded with carbon by blending a small amount of hot coal tar pitch with the preheated refractory grains, pressing the blend while hot into any desired shape, and then heating the shaped blend (at times in an inert or reducing atmosphere) to temperatures of 1200° F. to 2300° F. or even higher. During the heating step the coal tar pitch undergoes a pyrolytic reaction or "cracks." This reaction is similar to that which takes place in petroleum cracking stills or in the carbon electrode manufacturing process in which an initial binder of coal tar pitch is subsequently coked to form a carbon bond. During the course of the pyrolytic or "cracking" reaction, a volatile hydrocarbon fraction distills off to leave a residual carbon material or "coke" which serves to bond the refractory particles into one common mass. This process of heating or baking the refractory is hereinafter referred to as "coking." Brick produced in this manner have been widely used for lining various types of steelmaking furnaces, such as Thomas converters and the more recently developed oxygen converters.

For example, in the case of the oxygen converter, one method of producing the pyrolytic "cracking" or "coking" is first to install the uncoked pitch-bonded brick in the converter and then to introduce a charge of incandescent coke which is kept burning vigorously by the introduction of controlled amounts of oxygen. By this rapid heating, the brick are progressively coked from their interior surface toward the outer surface. This coking may be completely accomplished at the time of the initial heating or, in the case of thick refractory linings, it may be accomplished during the subsequent use of the furnace for steelmaking wherein successive heats of molten steel are brought up to high temperatures, refined, and tapped off into ladles.

The strength and adherence of the bond formed by coking is a very important property or characteristic of this type of brick. It must be both strong and resilient for the brick to withstand mechanical as well as thermal stresses to which brick are subjected. The carbon bond must also adhere firmly to the surfaces of the grains of dead-burned refractory to form a mechanically strong brick. In accordance with the present invention, these attributes of the bond of such a coal tar pitch-bonded refractory article are effectively improved.

It is, therefore, a principal object of the present invention to provide an improved dead-burned basic material containing iron which is adapted for forming a coal tar pitch-bonded refractory comprising calcium oxide and/or magnesium oxide containing iron which is capable of improved performance at elevated temperature conditions of use.

Other objects of the invention will become apparent as the description proceeds.

To the accomplishment of the foregoing and related ends, the invention consists of the features hereinafter fully described and particularly pointed out in the claims, the following disclosure describing in detail the invention, such disclosure illustrating, however, but one or more of the various ways in which the invention may be practiced.

It has been noted that the carbon bond of a coal tar pitch-bonded refractory weakens gradually at elevated temperatures. The present invention is based on the concept that at least one contributing factor to such weakening of the carbon bond is the oxidation thereof by oxygen derived from ferric iron compounds present. This in turn facilitates mechanical erosion of the refractory grains by molten metal and slag and penetration by metal or slag through capillary openings left in the refractory after such oxidation. Such penetration results in a rapid attack on the remaining refractory grains. Thus, in addition to reducing the amount and strength of the bond, its adherence to the grains of refractory is destroyed. It is in this adherence that the main source of mechanical strength lies, so that even a small amount of oxidation of the bond of the surface of the refractory results in a large loss of mechanical strength.

It is know that the iron in normally obtained deadburned dolomite and magnesia refractories is essentially in the oxidized state since the dead-burning process is conventionally carried out in rotary kilns. As a result of the conditions necessary for proper combustion of fuel to maintain the temperature requisite for dead-burning the ore in the kiln, at least 60 percent of the total iron in the resulting dead-burned material is ordinarily in the ferric state. Often as much as 90 percent of the iron in the clinker is in the ferric state. It is emphasized that such ferric iron may be present in a variety of ferric iron compounds containing oxygen, such as magnesioferrite, calcium ferrite, dicalcium ferrite, magnetite, and, to a smaller extent, ferric oxide. The kilns which produce the dead-burned material must have an oxidizing atmosphere or else efficiencies are substantially reduced and the product itself has poorer property characteristics.

Thus, there is a conflict among the desirable effect of iron as a flux in the dead-burning process, of the desirable and even necessary oxidizing atmosphere in a kiln, and the undesirable effect of ferric iron compounds containing oxygen on the carbon bond of a refractory article made from the dead-burned material.

In accordance with the present invention, I propose to increase the ferrous to ferric iron ratio in the dead-burned material prior to the formation of a refractory article such as a brick. Iron present in the ferrous state does not yield oxygen as rapidly or in as great amount to effect unwanted oxidation reactions. Particularly when a coal tar pitch-bonded refractory is used, the reduced iron compounds of the present development oxidize the carbon bond more slowly and to less extent with consequent increase of its effective life.

In carrying out the present invention, any decrease in the percentage of the total iron which occurs in the ferric state affords improved results. This means that the percentage of ferric iron is desirably at least lower than the usual minimum of 60 percent of the total iron as above indicated and preferably much lower, that is, percentages in the range of 5 percent to 30 percent of the total iron as ferric iron. It is not critical to the invention whether the reduction stops at the ferrous state or whether part of the iron is carried completely over to the metallic state. For purposes of the present disclosure and the appendant claims, non-ferric iron includes metallic iron as well as ferrous iron.

In accordance with the present invention, I chemically reduce the ferric iron in the dead-burned material prior to forming a carbon-bonded refractory therefrom. More particularly, a basic dead-burned material may be initially obtained by any of the conventional methods, for example, by firing dolomitic or magnesian ores as in a rotary kiln having an oxidizing atmosphere until the dead-burned state is realized or substantially so. Thereafter the dead-burned material is reduced by any process wherein an equilibrium is established that favors the reduction of the ferric iron compound, such as the conversion of ferric oxides to ferrous oxide, and, preferably, in which the rate of such conversion is great enough to obtain a substantial change of ferric oxide to ferrous oxide (or metallic oxide) within a practical period of time. In such a process the material would be enveloped with some reductant, gaseous or solid, which has a greater affinity for oxygen that the ferric oxide existent in the dead-burned material. Suitable gaseous reducing materials would be methane, ethane, propane, ethylene, refinery gas, and natural gas. A suitable solid would be carbon in its various form, or other carbonaceous materials such as coal or pitch, or a metal like aluminum or magnesium. However, the gaseous substances are more convenient to use as they can be easily separated from the dead-burned refractory. Generally it is necessary to treat the materials at an elevated temperature in order to obtain a practical rate of conversion. Substantial conversion rates of $Fe_2O_3$ to $FeO$ have been obtained at temperatures of 1800° F. and even greater rates at 2200° F. With some oxygen-scavenging materials, practical conversion rates may be obtained at lower temperatures, while other reductants may require higher temperatures than those stated to obtain satisfactory conversion rates. Using the above cited temperatures, substantial degrees of reduction have been obtained in periods varying between 2 and 8 hours.

As previously indicated, the strength of the carbon bond in prior coal tar pitch-bonded refractories gradually weakens through oxidation at elevated temperatures of use. Therefore the resistance of brick bonded with carbon to mechanical fracture is one measure of the quality of the bond and its adherence to the refractory grains. In order to illustrate the increased strength of the carbon bond of a coal tar pitch-bonded refractory prepared in accordance with the present invention, after even a few hours of exposure at elevated temperatures, the following comparative data are submitted. To provide a uniform basis for comparison, the ferrous to ferric iron ratio was increased in the indicated specimens by the same reducing treatment hereinafter described. However, favorable results are also attainable when any of the other described reducing techniques for this purpose are used.

Three different refractory formulations were employed. For each formulation specimens were prepared using conventionally prepared (oxidized) dead-burned refractory material and dead-burned refractory material prepared in accordance with the present invention. The latter, as compared to the former, therefore had a decreased ferric to ferrous iron ratio. Specimens embodying the present invention were obtained by placing dolomitic and magnesia dead-burned refractory grains in magnesia crucibles which were packed in metallurgical coke. The refractory grains were heated in an electrical resistance furnace at such a rate that the temperature of 1832° F. was reached in 16 hours. The furnace and contents were maintained at this temperature for 2 hours and then allowed to cool gradually for a period of 24 to 26 hours. The reduced refractory grains were then removed, sampled for analysis, and used in the following six formulations in which the mesh sizes are U.S. Standard Sieve.

FORMULATION 1

2.2 lbs. (15%) dead-burned dolomite passing 0.375″ opening and retained by 0.1875″ opening.
3.30 lbs. (22%) dead-burned dolomite passing 0.1875″ opening and retained by 6 mesh.
3.45 lbs. (23%) dead-burned dolomite passing through 14 mesh.
6.00 lbs. (40%) periclase, 65% of which passes through 200 mesh.
0.90 lb. (6% addition based on weight of refractory grains) of a coal tar pitch having a melting point within the range of 80° C. to 85° C.

Specimens prepared from this formulation using oxidized refractory grains are designed 1–O (for oxidized), while specimens prepared from this formulation using reduced refractory materials are designated 1–R (for reduced). The above terminology is employed for all formulations.

FORMULATION 2

3.75 lbs. (25%) dead-burned magnesia passing through 0.375″ openings and retained by 5 M.
3.75 lbs. (25%) dead-burned magnesia passing through 5 M and retained by 20 M.
1.50 lbs. (10%) dead-burned magnesia passing through 20 M.
6.00 lbs. (40% dead-burned magnesia, 65% of which passes through 200 M.
0.90 lbs. (6% addition) of the same coal tar pitch used in Formulation 1.

FORMULATION 3

3.75 lbs. (25%) periclase passing through 0.375″ openings and retained by 5 M.
3.75 lbs. (25%) periclase passing through 5 M and retained by 20 M.
1.50 lbs. (10%) periclase passing through 20 M.
6.00 lbs. (40%) periclase, 65% of which passes through 200 M.
0.90 lb. (6% addition) of the coal tar pitch used in Formulation 1.

The chemical analyses of the normal or oxidized materials and of the reduced materials used in these formulations were as follows before crushing to produce the sizes shown in the formulations:

*Chemical analyses of normal materials*

| | 0.375″+0.1875″ dead-burned dolomite, percent | −14 mesh dead-burned dolomite, percent | 0.375″+5 M dead-burned magnesia, percent | Periclase, percent |
|---|---|---|---|---|
| Ignition loss | 0.55 | 1.00 | 0.15 | (¹) |
| SiO₂ | 1.16 | 0.74 | 3.83 | 4.62 |
| Al₂O₃ | 0.68 | 0.42 | 1.02 | 0.49 |
| Total Fe | 4.79 | 2.61 | 2.27 | 0.24 |
| Ferrous Fe | 0.28 | 0.09 | 0.82 | 0.05 |
| TiO₂ | 0.48 | | | |
| Cr₂O₃ | | | | 0.02 |
| CaO | 52.54 | 54.90 | 3.98 | 0.11 |
| MgO | 37.70 | 39.32 | 87.88 | 94.37 |
| Percent of total Fe as ferric iron | 94.2 | 96.6 | 63.9 | 79.2 |

¹ Ign. Free Basis.

*Chemical analyses of reduced materials*

| Material | Percent Total Fe Present | Percent Ferrous Fe Present | Percent total iron in ferric state |
|---|---|---|---|
| −⅜″+.1875″ dead-burned dolomite | 4.62 | 3.23 | 30.1 |
| −.1875″+6 M dead-burned dolomite | 4.80 | 3.67 | 23.5 |
| −12 M dead-burned dolomite | 2.50 | 1.97 | 21.2 |
| −⅜″+5 M dead-burned magnesia | 2.15 | 1.57 | 27.0 |
| −5+20 M dead-burned magnesia | 2.29 | 1.90 | 17.0 |
| −20 M dead-burned magnesia | 3.09 | 2.89 | 6.7 |
| 65%−200 M dead-burned magnesia | 2.22 | 2.08 | 6.3 |
| −⅜″+5 M periclase | 0.20 | 0.10 | 50.0 |
| −5″ 20 M periclase | 0.22 | 0.16 | 27.3 |
| −20 M periclase | 0.20 | 0.15 | 25.0 |
| 65%−200 M periclase | 0.20 | 0.15 | 25.0 |

In all cases the materials of each formulation were preheated to 300° F., mixed, and then pressed at 5 tons per square inch pressure into cylindrical plugs measuring 3½ inches by 2 inches. In one test series, 2 plugs were made from both the oxidized and reduced grains and for each formulation. These plugs were packed in graphite and heated in an electrical resistance furnace at such a rate that a temperature of 1832° F. was obtained in 16 hours. The furnace was held at this level for 2 hours and then the furnace and contents allowed to cool to room temperature over a period of from about 24 to 26 hours.

The compressive strengths of the resulting cylindrical plugs were determined by submitting them to standard compressive crushing tests in a compression testing machine. The crushing strength was determined by dividing the total crushing load by the cross-sectional area of the cylindrical plug. These compressive strengths were as follows:

*Compressive strengths of plugs coked at 1832° F.*

| Formulation | Av. of plugs | P.s.i. |
|---|---|---|
| 1-O | 2 | 3,955 |
| 1-R | 2 | 4,040 |
| 2-O | 2 | 5,396 |
| 2-R | 2 | 7,402 |
| 3-O | 2 | 2,317 |
| 3-R | 2 | 3,277 |

In another test series 3 plugs were made from both the oxidized and reduced refractory grains and for each formulation. These plugs were packed in coke in a brick vessel built inside a Globar furnace and then fired for about 4 hours at 2500° F. After firing and cooling, the plugs were crushed and the compressive strengths, obtained as previously described, and chemical analyses of the plugs were as follows:

*Compressive strengths of plugs fired at 2500° F.*

| Formulation | Av. of plugs | P.s.i. |
|---|---|---|
| 1-O | 3 | 2,336 |
| 1-R | 3 | 2,467 |
| 2-O | 3 | 2,825 |
| 2-R | 3 | 4,049 |
| 3-O | 3 | 1,808 |
| 3-R | 3 | 3,578 |

*Chemical analyses of plugs fired at 2500° F.*

| Formulation | Percent total Fe present | Percent total iron in ferric state |
|---|---|---|
| 1-O | 2.48 | 4.0 |
| 1-R | 2.37 | *−1.8 |
| 2-O | 2.41 | 4.1 |
| 2-R | 2.34 | 2.7 |
| 3-O | 0.24 | 27.9 |
| 3-R | 0.24 | 27.9 |

* Analytical error.

In every case the plugs prepared with a reduced basic refractory material had greater strength than the plugs prepared with the normal material, that is, a dead-burned refractory grain prepared under an oxidizing atmosphere and having a high percentage of ferric iron.

It will now be apparent that I have provided an improved dead-burned refractory material adapted for forming a refractory article and particularly a coal tar pitch-bonded refractory article. The tar bonded articles of this invention are capable of improved performance of elevated temperature conditions of use through an effectively stronger carbon bond by minimizing the oxidizing action of any ferric oxide present on such carbon bond with resultant weakening thereof. The present invention provides a means for reducing both the amount of oxygen combined with ferric iron and its chemical activity.

Other forms embodying the features of the invention may be employed, change being made as regards the features herein disclosed, provided those stated by any of the following claims or the equivalent of such features be employed.

I therefore particularly point out and distinctly claim as my invention:

1. Basic dead-burned refractory grains containing a metal oxide selected from the group consisting of calcium oxide and magnesium oxide and obtained by dead-burning a basic refractory ore and including a compound containing iron and oxygen, said grains being adapted for bonding together to define a refractory article, the iron of said compound having a chemically reduced ferric iron content prior to said bonding together of the grains to form a refractory article, as compared to such ferric iron content present in the grains as originally obtained from dead-burning said ore.

2. Basic dead-burned refractory grains containing a metal oxide selected from the group consisting of calcium oxide and magnesium oxide obtained by dead-burning a basic refractory ore and including a compound containing iron and oxygen, said grains being adapted for bonding together to define a refractory article, the iron of said compound having a chemically reduced ferric iron content prior to said bonding together of the grains to form a refractory article, less than 60 percent by weight of the iron of said compound being in the ferric state.

3. A bonded refractory article consisting essentially of particles of a basic refractory having a carbon bond to form an integral mass and an iron compound present with such refractory in an amount up to about 8 percent by weight, less than 60 percent by weight of the iron in said compound being in the ferric state prior to any substantial deterioration of said carbon bond.

4. A basic refractory composition of matter comprising carbon-bonded refractory grains containing a metal oxide selected from the group consisting of calcium oxide and magnesium oxide, and an iron-containing compound in which the iron content has been substantially chemically reduced to a non-ferric state prior to any substantial weakening of said carbon bond by oxidation.

5. A bonded refractory article comprising particles of refractory grains containing a metal oxide selected from the group consisting of a calcium oxide and magnesium oxide, said grains being bonded together with carbon to form an integral mass and having, prior to any substantial weakening of said carbon bond by oxidation, an iron compound present in an amount up to about 8 percent by weight, less than 60 percent by weight of said iron in said compound being in the ferric state.

6. In the method of forming a carbon-bonded refractory from basic refractory material including a compound containing ferric iron and oxygen, the improvement comprising chemically reducing at least some of the ferric iron content in said compound, admixing a sufficient amount of a pyrolytically decomposable carbon compound with said basic refractory material to form a bond, and then heating the admixture to decompose said carbon compound and form said carbon bond.

7. A method of forming a carbon-bonded refractory from basic dead-burned refractory grains containing a metal oxide selected from the group consisting of calcium oxide and magnesium oxide, iron in an amount up to about eight percent by weight of the refractory grains, and a compound containing ferric iron and oxygen, said ferric iron constituting at least 60 percent by weight of the total iron present, comprising the steps of chemically reducing a sufficient amount of such ferric iron to a nonferric state to decrease the net ferric iron content at least to an amount within the range of about five percent to about 30 percent by weight of the total iron present, admixing a sufficient amount of coal tar pitch with such refractory grains to form a bond, shaping the resulting admixture, and then heating the shaped admixture to a temperature sufficient to decompose pyrolytically the coal tar pitch and form said carbon bond among the refractory grains, such decreaesd ferric iron content effectively improving the strength and adherence of the carbon bond at elevated temperatures.

8. In the method of forming a carbon-bonded refractory article from a basic dead-burned material containing a metal oxide selected from the group consisting of calcium oxide and magnesium oxide and including a compound containing ferric iron and oxygen, the improvement comprising chemically reducing ferric iron in said compound of dead-burned material, admixing a pyrolytically-decomposable carbon compound with said dead-burned material, and then heating the admixture to decompose said carbon compound and form a carbon bond.

9. A method of forming a carbon-bonded refractory from basic dead-burned refractory grains containing a metal oxide selected from the group consisting of calcium oxide and magnesium oxide and including a compound containing ferric iron and oxygen, comprising the steps of chemically reducing at least some of the ferric iron in such refractory grains to a non-ferric state, mixing a coal tar pitch with such grains, and then heating the admixture to coke the coal tar pitch and effect a carbon bond.

10. A method of forming a carbon-bonded refractory from basic dead-burned refractory grains containing a metal oxide selected from the group consisting of calcium oxide and magnesium oxide and including a compound containing ferric iron and oxygen, said ferric iron constituting at least 60 percent by weight of the iron present, comprising the steps of chemically reducing the ferric iron content of said compound, mixing a coal tar pitch with said grains and chemically reduced compound, forming the resulting admixture into a desired shape, and then heating such shape to coke the coal tar pitch and effect a carbon bond, such decreased ferric iron content effectively improving the strength and adherence of the carbon bond at elevated temperatures.

11. The method of claim 10 wherein such step of chemically reducing the ferric iron content comprises incorporating with the dead-burned refractory grains an agent effective to convert ferric ions to ferrous ions.

12. The method of claim 10 wherein the ferric iron content is decreasd to a percentage of the total iron present within the range of about 5 percent to about 30 percent.

13. The method of claim 10 wherein such step of chemically reducing the ferric iron content comprises heating such dead-burned refractory grains with a gaseous reducing agent.

14. The method of claim 10 wherein such step of chemically reducing the ferric iron content comprises heating such dead-burned refractory grains with a solid reducing agent.

15. The bonded refractory article of claim 3 wherein the ferric iron constitutes about 5 percent to about 30 percent by weight of the total iron.

16. The method of claim 10 wherein such step of chemically reducing the ferric iron content comprises heating such dead-burned refractory grains with a reducing agent selected from the group consisting of methane, ethane, propane, ethylene, refinery gas, natural gas, carbon, aluminum, and magnesium.

17. A dead-burned basic refractory material including a compound containing iron and oxygen, said basic refractory material being adapted for use in the formation of a shaped refractory article, said compound prior to the formation of said shaped refractory having a chemically reduced ferric iron content as compared to the ferric iron present in the material as originally obtained by dead-burning.

References Cited by the Examiner
UNITED STATES PATENTS

| 2,943,240 | 6/60 | Martinet | 106—58 |
| 3,015,850 | 1/62 | Rusoff et al. | 106—56 |
| 3,030,228 | 4/62 | Hernandez et al. | 106—58 |

TOBIAS E. LEVOW, *Primary Examiner.*

JOSEPH REBOLD, JOHN R. SPECK, *Examiners.*